US010558636B2

United States Patent
She et al.

(10) Patent No.: US 10,558,636 B2
(45) Date of Patent: Feb. 11, 2020

(54) INDEX PAGE WITH LATCH-FREE ACCESS

(71) Applicant: SAP SE, Walldorf (DE)

(72) Inventors: Zheng-wei She, Shanghai (CN); Xu-dong Qian, Shanghai (CN); Zhi-ping Xiong, Shanghai (CN)

(73) Assignee: SAP SE, Walldorf (DE)

( * ) Notice: Subject to any disclaimer, the term of this patent is extended or adjusted under 35 U.S.C. 154(b) by 473 days.

(21) Appl. No.: 15/139,963

(22) Filed: Apr. 27, 2016

(65) Prior Publication Data

US 2017/0316042 A1    Nov. 2, 2017

(51) Int. Cl.
G06F 16/22    (2019.01)
G06F 16/2452    (2019.01)

(52) U.S. Cl.
CPC ...... *G06F 16/2272* (2019.01); *G06F 16/2282* (2019.01); *G06F 16/24524* (2019.01)

(58) Field of Classification Search
CPC ......... G06F 17/30351; G06F 17/30327; G06F 17/30292; G06F 17/30336; G06F 17/30377; G06F 17/30339; G06F 12/0891; G06F 12/0246; G06F 16/2272; G06F 16/2282; G06F 16/24524
See application file for complete search history.

(56) References Cited

U.S. PATENT DOCUMENTS

| | | | | |
|---|---|---|---|---|
| 5,123,104 A | | 6/1992 | Levine et al. | |
| 5,794,229 A | * | 8/1998 | French | G06Q 40/00 |
| 5,842,196 A | * | 11/1998 | Agarwal | G06F 17/30327 |
| 5,918,224 A | * | 6/1999 | Bredenberg | G06F 12/0815 |
| 5,918,225 A | * | 6/1999 | White | G06F 17/30324 |
| 6,282,605 B1 | | 8/2001 | Moore | |
| 6,363,387 B1 | * | 3/2002 | Ponnekanti | G06F 17/30348 |
| 6,397,227 B1 | * | 5/2002 | Klein | G06F 17/30377 |
| 6,411,964 B1 | * | 6/2002 | Iyer | G06F 17/30339 |
| 6,453,313 B1 | * | 9/2002 | Klein | G06F 17/30421 |
| 6,591,269 B1 | * | 7/2003 | Ponnekanti | G06F 17/30327 |

(Continued)

FOREIGN PATENT DOCUMENTS

WO    WO 2015/108521 A1    7/2015

OTHER PUBLICATIONS

Levandoski et al., Indexing on Modern Hardware: Hekaton and Beyond, Jun. 22-27, 2014, Microsoft/SIGMOD'14, pp. 1-4.*

(Continued)

*Primary Examiner* — Jay A Morrison
*Assistant Examiner* — Antonio J Caiado
(74) *Attorney, Agent, or Firm* — Sterne, Kessler, Goldstein & Fox P.L.L.C.

(57) ABSTRACT

Disclosed herein are system, method, and computer program product embodiments for providing read queries latch-free access to an index page. In an embodiment, a processor receives a request from a read query to access one or more records of an index page. The index page includes an update pointer and a slot array. The processor locates one or more updates prepended to the index page by locating a most recently prepended update indicated by the update pointer. Then, the processor generates a local offset table with entries in the slot array and the located one or more updates. The generated local offset table enables the processor to provide the read query access to the one or more records of the index page.

16 Claims, 7 Drawing Sheets

(56) References Cited

U.S. PATENT DOCUMENTS

| | | | | |
|---|---|---|---|---|
| 6,631,366 | B1* | 10/2003 | Nagavamsi | G06F 17/30477 707/713 |
| 6,792,432 | B1* | 9/2004 | Kodavalla | G06F 17/30348 |
| 7,197,620 | B1* | 3/2007 | Adcock | G06F 12/1018 711/202 |
| 7,383,389 | B1* | 6/2008 | Bumbulis | G06F 12/0842 711/130 |
| 7,974,992 | B2 | 7/2011 | Fastabend et al. | |
| 8,170,997 | B2 | 5/2012 | Lomet et al. | |
| 2002/0087500 | A1* | 7/2002 | Berkowitz | G06F 16/2365 |
| 2003/0195898 | A1* | 10/2003 | Agarwal | G06F 17/30592 |
| 2005/0154765 | A1* | 7/2005 | Seitz | G06F 9/5016 |
| 2008/0065670 | A1 | 3/2008 | Cha et al. | |
| 2009/0254522 | A1* | 10/2009 | Chaudhuri | G06F 16/217 |
| 2010/0325181 | A1* | 12/2010 | Skillcorn | G06F 16/14 707/829 |
| 2011/0252000 | A1 | 10/2011 | Diaconu et al. | |
| 2013/0006950 | A1* | 1/2013 | Adayilamuriyil | G06F 16/278 707/704 |
| 2013/0346725 | A1* | 12/2013 | Lomet | G06F 12/10 711/206 |
| 2015/0074041 | A1* | 3/2015 | Bhattacharjee | G06F 17/30448 707/607 |
| 2015/0134709 | A1* | 5/2015 | Lee | G06F 12/0804 707/812 |
| 2016/0055191 | A1* | 2/2016 | Joshi | G06F 17/30336 707/744 |
| 2016/0070746 | A1* | 3/2016 | Bender | G06F 16/2372 707/696 |
| 2016/0110403 | A1* | 4/2016 | Lomet | G06F 16/2329 707/695 |
| 2016/0147448 | A1* | 5/2016 | Schreter | G06F 3/0604 711/159 |
| 2016/0147811 | A1* | 5/2016 | Eluri | G06F 17/30348 707/694 |
| 2016/0357791 | A1* | 12/2016 | Levandoski | G06F 12/1009 |
| 2016/0371368 | A1* | 12/2016 | Brown | G06F 16/332 |
| 2017/0109384 | A1* | 4/2017 | Zhu | G06F 17/30321 |

OTHER PUBLICATIONS

Kissinger et al., KISS-Tree: Smart Latch-Free In-Memory Indexing on Modern Architectures, Database Technology Group Technische Universität Dresden / Proceedings of the Eighth International Workshop on Data Management on New Hardware (DaMoN 2012), May 21, 2012, pp. 1-8.*

Takashi Horikawa, Latch-Free Data Structures for DBMS, Jun. 22-27, 2013, NEC Corporation/SIGMOD'13, pp. 1-12.*

Pandis et al., PLP: Page Latchfree Sharedeverything OLTP, Sep. 3, 2011, The 37th International Conference on Very Large Data Bases, Oages 1-12.*

Jason Sewall, et al., "PALM: Parallel Architecture-Friendly Latch-Free Modifications to B+ Trees on Many-Core Processors," Parallel Computing Lab, Intel Corporation, 12 pages.

Thomas Kissinger, et al., "KISS-Tree: Smart Latch-Free In-Memory Indexing on Modern Architectures," Proceedings of the Eighth International Workshop on Data Management on New Hardware, Database Technology Group, May 21, 2012, 8 pages.

Natasha Saldanha and Karthik Mahadevan, "Implementation of PALM: Parallel Architecture-Friendly LatchFree Modifications to B+ Trees on Many-Core Processors," NYU.edu, 8 pages.

Goetz Graefe, "A survey of B-tree locking techniques," HP Laboratories, Jan. 21, 2010, vol. 35, No. 2, 18 pages.

Justin Levandoski and Sudipta Sengupta, "The BW-Tree: A Latch-Free B-Tree for Log-Structured Flash Storage".

* cited by examiner

INDEX PAGE WITH LATCH-FREE ACCESS

BACKGROUND

When one or more queries concurrently access a database index page, database systems typically implement latches to ensure data integrity. But latches can induce resource contention when multiple queries attempt to concurrently access the same page, which may result in severely degraded performance and increased execution time of the queries. Conventionally, latches may cause page-level contention because update queries and read queries block each other from accessing the same page. Additionally, when a query makes updates (e.g., inserts, updates, or deletes records) to the database page, that query acquires an exclusive latch that may prevent other queries from either reading or writing to the page.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for providing read queries latch-free access to an index page. In an embodiment, a database management system (DBMS) implements an index page having prepended updates, each update representing a change made by an update query to the index page. When the DBMS receives a request from a read query to access the index page, the DBMS scans any prepended updates and scans a slot array within the index page to generate a local offset table. By generating the generated local offset table, the DBMS enables the read query to access records within either the index page or prepended updates regardless of whether other read or update queries are concurrently accessing (or requesting access to) that index page. In an embodiment, a new update may be prepended to the index page while the read query is accessing that index page. To maintain data integrity, the DBMS may regenerate the local offset table for that read query based on attributes associated with the read query.

Figure 1:
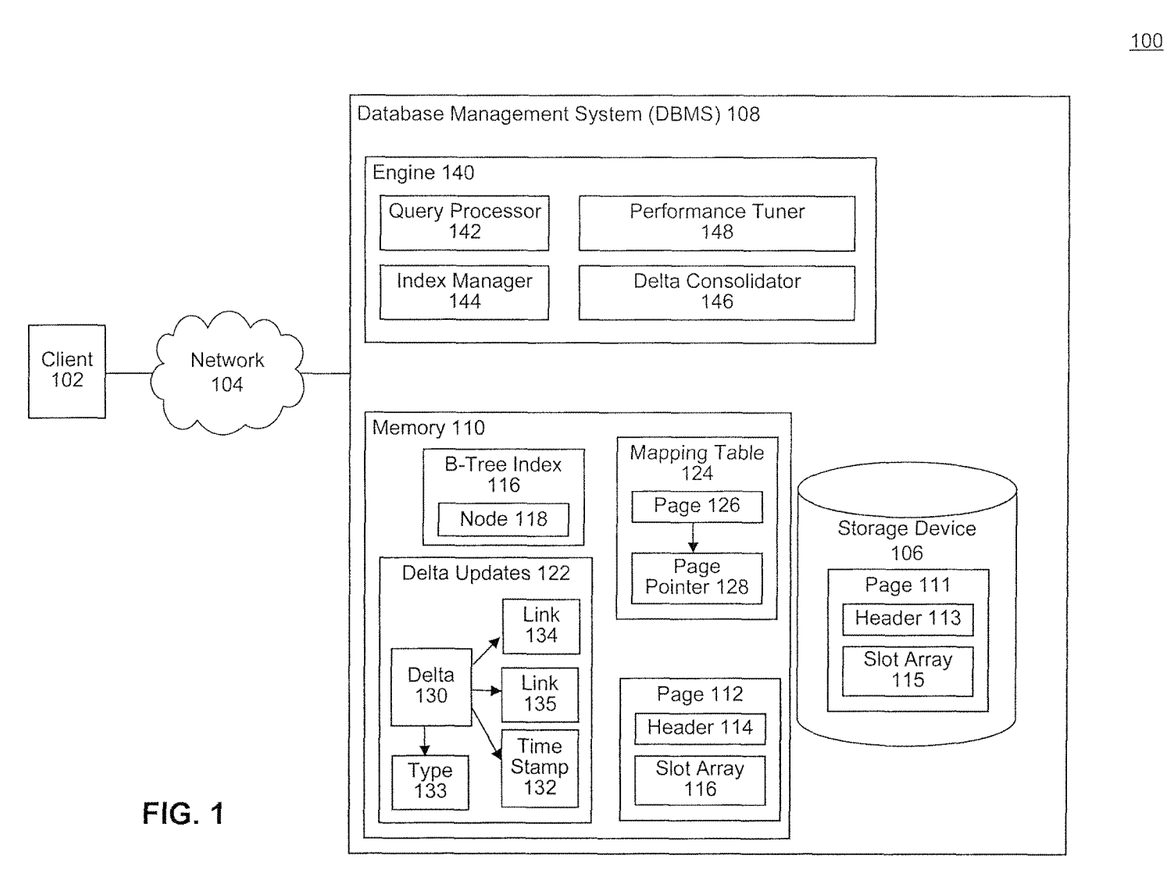
FIG. 1 is a block diagram of a database system that implements an index page for latch-free reading, according to an example embodiment.

FIG. 1 is a block diagram of a database system 100 for implementing an index page for latch-free reading, according to an example embodiment. System 100 includes client 102, network 104, and database management system (DBMS) 108. DBMS 108 may further include engine 140 and memory 110. Client 102 may communicate with DBMS 108 over network 104. Network 104 may be, for example, a LAN (Local Area network), MAN (metropolitan area network), WAN (Wide Area Network) such as the Internet, or any combination thereof. Network 104 may further utilize Ethernet communications, although other wired and/or wireless communication techniques, protocols and technologies can be used.

Client 102 may be any computing device capable of connecting to network 104. For example, a computing device may be a laptop, a desktop computer, or a mobile device (e.g., a mobile phone). Client 102 may be used by a user to access an application for communicating with DBMS 106 to, for example, retrieve data from storage device 106 within memory 110.

Database storage 106 may be implemented as one or more in-memory databases, disk storage devices, or a combination thereof. When implemented in disk storage, database storage 106 may be implemented external to memory 110. Otherwise, storage device 106 may be a component within memory 110. In an embodiment, database storage 106 may be implemented as distributed databases or memories. Data stored in database storage 106 may be logically organized in the form of tables, each table having a number of rows (i.e., records) and columns (i.e., fields). Each row in a table generally has a data value associated with each column of the table. This intersection between one row and one column is commonly referred to as a cell.

While data records are logically organized using tables, database storage 106 may physically store the data records (within a table) in one or more sequentially numbered "pages." In this context, page 111 may be a unit of storage, commonly but not limited to 16 KB in size, that is accessed via a physical storage address. Page 111 may include header 113 that stores metadata about the page including, for example, a page number, a page type, free space on the page, and an identifier (ID) of the object that owns the page. For example, a page type may be a data page or an index page. Records may be serially written into the free space starting from the header. In an embodiment, page 111 may include slot array 115 (that may start at the end of page 111) for accessing the stored records. Slot array 115 may be an array of offsets (from a pointer of page 111) into page 111 where records are physically stored.

In an embodiment, DBMS 108 may read page 111 from storage device 106 to memory 110 as page 112. By storing page 111 as page 112 in memory 110, DBMS 108 may be capable of processing data from page 112 faster than from page 111. Page 112 may include header 114 and slot array 116 that represent the information read from header 113 and slot array 115, respectively.

To speed up retrieval of records or otherwise improve processing in a database table, DBMS 108 may implement an index on one or more columns of the table. The values in the indexed column(s) for the records are referred to as key values. The index effectively speeds up record retrieval by sorting the records according to their key values. In an embodiment, DBMS 108 may include a data structure such as B-tree index 116 for implementing and organizing the index. In an embodiment, when an index is implemented to allow fast retrieval of records, records within page 112 may continue to be serially written into the free space of page 112. But records may be logically sorted by slot array 115 such that the array of offsets are sorted for the key value(s) or indexed value(s) of the stored records.

B-tree index 116 is a generalization of a binary search tree in which each node 118 can have more than two children. The top level of B-tree index 116 may include one root node. The bottom level may include leaf nodes. Any index levels between the root and the leaf nodes are collectively known as intermediate nodes. Node 118 may be implemented as an index page (such as page 112) holding index records. Each index record may include a key value (or indexed value) and a pointer to either a lower-level intermediate node or a leaf node. In an embodiment, each node 118 may further include links to other nodes on the same level. B-tree index 116 may be implemented as a clustered or non-clustered index structure, which affects whether leaf nodes contain the records of the underlying tables or merely pointers to those records.

When managing the pages of B-tree index 116, DBMS 108 may configure and implement, within memory 110, mapping table 124 to be associated with B-tree index 116. Mapping table 124 may map logical identifiers of each page 126 (page IDs or PIDs) to a corresponding page pointer 128, representing the physical storage address of page 112. By separating the logical page from its physical storage, mapping table 124 allows the logical page to be physically transferred to another physical address without affecting the overall structure of B-tree index 116.

To access data within the tables of database storage 106, client 102 typically issues a request to DBMS 108 in the form of a query. Queries may be read-only, hereinafter referred to as read queries, or may include one or more updates (e.g., inserts, updates, or deletes), hereinafter referred to as update queries. When processing a query from client 102, DBMS 108 may traverse one or more node 116 of B-tree index 116 to speed up locating page 112 to update or read records to or from page 112.

The query may be specified in a database manipulation language, such as Structured Query Language (SQL). SQL is well known and is described in many publicly available documents, including "Information Technology—Database languages—SQL," published by the American National Standards Institute as American National Standard ANSI/ISO/IEC 9075: 1992. Although the following embodiments may be described with respect to SQL query statements, a skilled artisan would recognize that described embodiments are equally applicable to query statements specified in other database manipulation languages.

To provide read queries with latch-free access to an index page corresponding to node 118, DBMS 108 may further implement delta updates 122 for each node 118. In an embodiment, since node 118 may be represented by or is associated with page 112, DBMS 108 may associate delta updates 122 with page 112 that corresponds to node 118. Instead of updating/changing (e.g., deleting, updating, or adding) records directly in node 118, for each update made to node 118, DBMS 108 may prepend a delta update (i.e., delta 130) to page 112 of node 118. Delta 130 may be stored with type 133, time stamp 132, link 134, and/or link 135. Type 134 may indicate that delta 130 is, for example, an insert, update, or delete operation. Time stamp 132 may indicate when an update query added delta 130. In an embodiment where delta updates 122 store a linked list of deltas, link 134 of delta 130 includes a pointer to the next recently-prepended delta. And link 135 of each delta 130 contains a pointer to the index page, e.g., page 112. The least-recently prepended delta may include link 134 that contains a pointer to NULL. To access delta updates 122 from the page 112, header 114 may additionally include an update pointer that indicates the most-recent delta 130. In an embodiment, since page 112 may be representative of and copied from page 111 stored in storage device 106, it may be desirable to minimize changing the underlying structures of page 112. As such, DBMS 108 may attach or associate a separate buffer header with page 112. For example, DBMS 108 may append or link a buffer header with page 112. Then, DBMS 108 may store the update pointer within this buffer header.

By prepending delta updates 122 to node 118, DBMS 108 enables read queries to concurrently access node 118 with other read queries or update queries, as will be further explained with respect to FIGS. 2-6.

To manage and implement the data structures of memory 110, DBMS 108 includes engine 140. In an embodiment, engine 140 includes the following components: query processor 142, index manager 144, delta consolidator 146, and performance tuner 148. A component of engine 140 may include a selection of stored operations that when executing in one or more processors of DBMS 108 causes the one or more processors to perform the operations of that component.

Query processor 142 may process read or update queries received from one or more client(s) 102 via network 104. When reading records from database storage 106 or B-tree index 116, query processor 142 may return query results back to client 102. In an embodiment, query processor 142 may process configuration commands (or queries) received from client 102. For example, a configuration command may be to create a database table with a latch-free index on one or more columns. Or a configuration command may be to create a latch-free index on one or more columns of an existing database table. When creating the latch-free index pages, query processor 142 may send commands or requests to index manager 144.

Index manager 144 may create and manage B-tree index 116 for database tables, delta updates 122, and mapping table 124 for locating index pages of B-tree index 116. Specific configuration details and mechanism of latch-free page access provided by index manager 144 are further described with respect to FIGS. 2, 3, and 6. Though index manager 144 requires additional memory 110 and processing overhead for managing delta updates 122, the reduced access latencies provided to read and write queries may vastly outweigh the minimal overhead costs. Though delta updates 122 further enable queries concurrent access to the index page, index manager 144 may require more and more storage and processing time to process queries as the number of delta updates 122 increases.

To address the growing overhead costs, delta consolidator 146 may periodically consolidate delta updates 122 with an index page representing node 118. The processing costs to consolidate delta updates 122 may be minimal in the long run when compared to overhead costs for managing many delta updates 122. In an embodiment, delta consolidator 146 may initiate consolidation when the number of delta updates 122 exceeds (or meets) a threshold count, or when delta updates 122 requires memory storage exceeding (or meeting) a threshold amount. In an embodiment, delta consolidator 146 may make this consolidation decision when processing update queries, as further described with respect to FIGS. 4-5. In an embodiment, delta consolidator 146 may initiate consolidation whenever records of a page are to be written to database storage 106, for example, when a checkpoint is run to backup records or when records of a page are flushed to storage device 106.

Performance tuner 148 may adjust the parameters used by delta consolidator 146 to decide when to initiate consolidation. By tuning these parameters, performance tuner 148 may maximize performance of query processing, e.g., by minimizing the time to process each query. In an embodiment, the parameters may include one or more of a threshold count of delta updates 122, or a threshold amount of memory. These parameters affect how frequently consolidation occurs and how fast records can be searched in the index pages.

FIGS. 2A-D are diagrams illustrating how read and update queries concurrently access page 202, an example index page, according to an example embodiment. In an embodiment, page 202 may be an example implementation of page 112 from FIG. 1. Page 202 may be managed and configured by one or more components of engine 140 from FIG. 1.

Figures 2A, 2B:
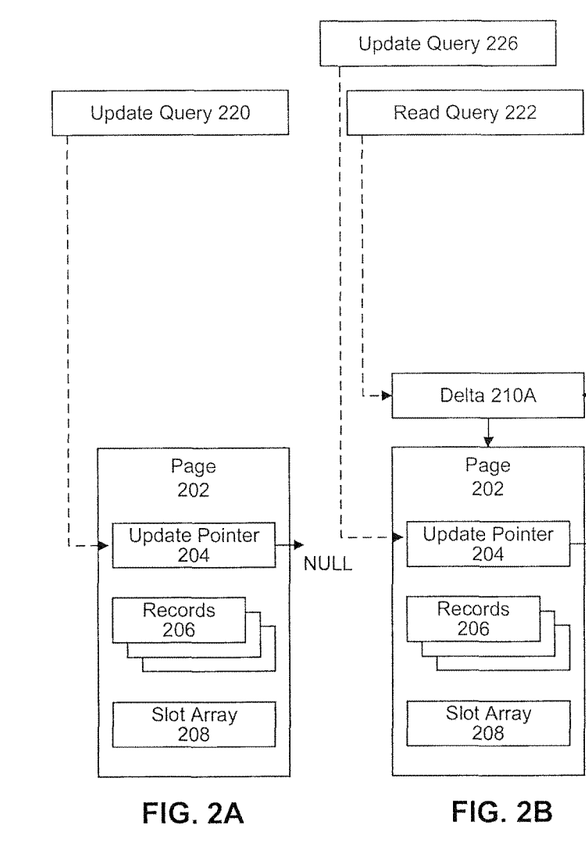
FIGS. 2A-D are diagrams illustrating how read and update queries concurrently access an index page, according to an example embodiment.

As described with respect to page 112 in FIG. 1, page 202 may similarly include a header storing update pointer 204, records 206 in the free space of page 202, and slot array 208 storing a sorted array of entries representing records 206. Each entry in slot array 208 may be an offset (from a physical address of page 202) that indicates or locates a corresponding one of records 206. In an embodiment, update pointer 204 may be stored within a buffer header associated with or linked to page 202.

In an embodiment, when query processor 142 receives a request from update query 220 to access page 202, no delta updates 122 may be prepended to page 202. So, update pointer 204 includes a null pointer. To process update query 220 concurrently with one or more subsequent or current read queries, index manager 144 prepends delta 210A (of update query 220) to page 202. As shown in FIG. 2B, delta 210A may be prepended to page 202. Depending on the update, delta 210A may be to insert a record, delete a record, or update a record. Since delta 210A is the least-recent update, a link of delta 210A may point to page 202. Index manager 144 also updates update pointer 204 to include a pointer indicating the most-recent update delta 210A.

In FIG. 2B, query processor 142 may receive a request from read query 222 to access records associated with page 202. As depicted, a record may be stored in records 206 or delta 210A. To enable read query 222 to concurrently read page 202, index manager 144 locates or scans one or more delta updates prepended to page 202. To do this, index manager 144 locates the most-recently prepended delta update using update pointer 204. Then, index manager 144 may scan one or more deltas 210 linked to the most-recently prepended update, delta 210A. As further described with respect to FIG. 3, to provide read query 222 access to records associated with page 202, index manager 144 may generate a local offset table based on the scanned deltas 210 and slot array 208. While query processor 142 is processing read query 222, query processor 142 may receive a request to access page 202 from update query 226.

Figure 2C:
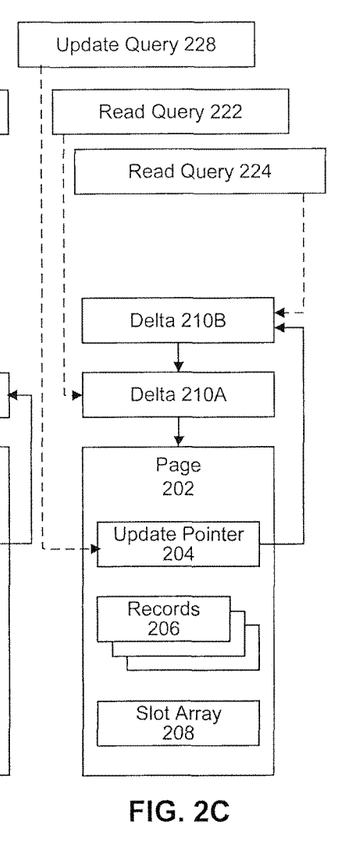

In FIG. 2C, similar to the process described with respect to FIG. 2B, index manager 144 may prepend delta 210B (indicated by update query 226) to page 202. As shown, update pointer 204 is changed to point to the most-recent update, delta 210B, which links to the next most-recent update, delta 210A. In an embodiment, based on one or more attributes received with read query 222, index manager 144 may determine that read query 222 should not be able to read the new update, delta 210B. This may be because it is not necessary for read query 222 to read delta 210B. Thus, read query 222 continues to have access to records 206, delta 210A, and any deltas 210 older than delta 210A.

While providing read query 222 access to page 202, query processor 142 may receive a request from read query 224 to access page 202. Similar to how read query 222 was processed, index manager 144 first locates the most-recently prepended update, delta 210B, via update pointer 204. Then, index manager 144 provides read query 224 access to records 206, delta 210A, and every update older than (or reachable from) delta 210B. Particularly, index manager 144 may also generate a local offset table for read query 224. Subsequently, query processor 142 may receive a request from update query 228 to access page 202. By implementing this described mechanism, index manager 144 allows read queries access to page 202 concurrently with one or more read or update queries.

Figure 2D:
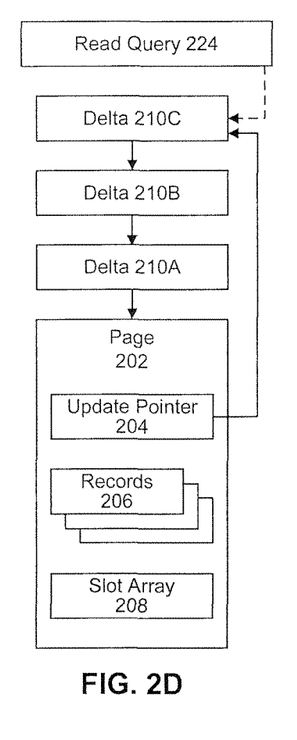

In FIG. 2D, similar to the process described with respect to FIG. 2B, index manager 144 may prepend delta 210C (indicated by update query 228) to page 202. As shown, read query 222 is absent, indicating that read query 222 has finished accessing page 202. In contrast to how read query 222 is processed with respect to FIG. 2C, index manager 144 may determine that read query 224 may need access to the most-recently prepended update, delta 210C. Thus, index manager 144 may locate delta 210C via update pointer 204 and rescan deltas 210A-B older than delta 210C. In this case, index manager 144 may regenerate the local offset table previously generated in FIG. 2C.

Figure 3:
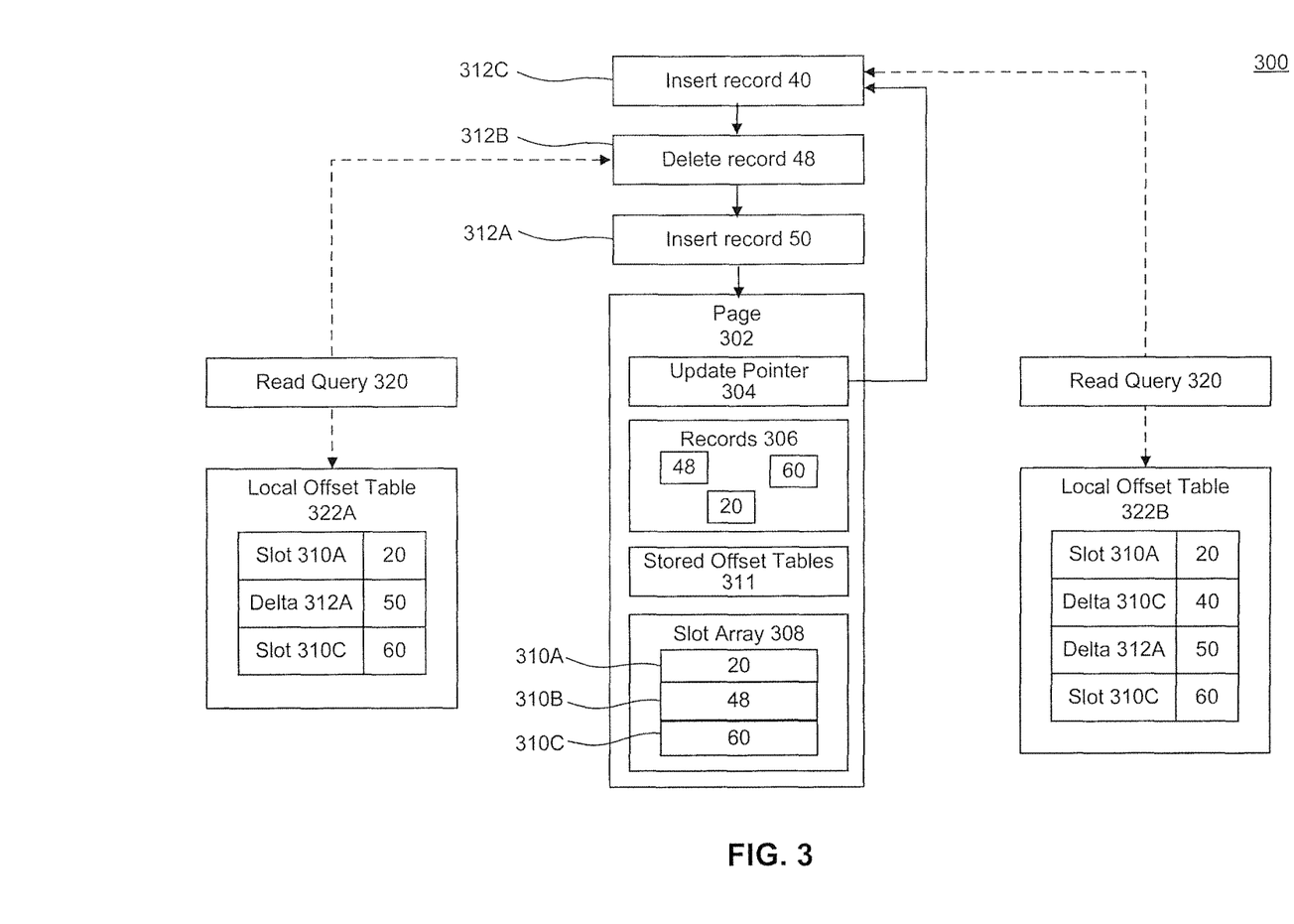
FIG. 3 is a diagram illustrating mechanisms that allow read queries to concurrently access an index page, according to an example embodiment.

FIG. 3 is a diagram 300 illustrating mechanisms that allow read query 320 to concurrently access an index page, page 302, without blocking other read or update queries, according to an example embodiment. Much like page 202 of FIG. 2 or page 112 of FIG. 1, page 302 may include update pointer 304 (within a header), records 306, and slot array 308. Update pointer 304 may include a pointer to the most-recently updated delta update, delta 312C.

In an embodiment, records 306 may be written serially independent of an indexed value within that record. Therefore, a record having an index value 20, "record 20," may be written into records 306 after record 48 and record 60. Slot array 308 may contain slots 310A-C that include offsets to record 306 sorted by corresponding index values. As shown, the slots 310A-C store respective offsets to records 20, 48, and 60. For ease of reference, descriptions below will reference the components of engine 140 in FIG. 1.

In an embodiment, before index manager 144 prepends delta 312C, "insert record 40," to page 302, read query 320 may generate local offset table 322A to access records associated with page 302. In an embodiment, local offset table 322A may include an array sorting entries of slot array 308 with applied one or more deltas 312 accessible by read query 320. In each entry, local offset table 322A may store an offset or a pointer. In an embodiment, local offset table 322A stores offsets for entries from slot array 308 and pointers for deltas 312. In an embodiment, local offset table 322A may also store offsets for deltas 312 if deltas 312 are stored within page 302. As shown, local offset table 322A stores sorted entries for records 20, 50, and 60. An entry for record 48 may be omitted from local offset table 322A because index manager 144 applied delta 312B that deletes record 48 from page 302. In an embodiment, index manager 144 stores a source (e.g., one of slot 310 or delta 312) associated with each entry. To enable read query 320 to access page 302 concurrently with other read or update queries, read query 320 would access local offset table 322A to locate specific records.

After delta 312C has been prepended and read query 320 continues to access page 302, index manager 144 may determine whether to regenerate local offset table 322A as local offset table 322B. In an embodiment, index manager 144 may generate local offset table 322B based on attributes received with read query 320. For example, index manager 144 may determine whether to regenerate local offset table 322A based on an isolation level, an example attribute, required by read query 320. In an embodiment, index manager 144 maintains the originally generated local offset table 322A when an associated isolation level requires serializability or when the isolation level indicates that the read query is precluded from accessing new prepended updates such as delta 312C. As shown, when compared to local offset table 322A, local offset table 322B additionally sorts record 40 corresponding to delta 312C with older deltas, deltas 312A-B, and slots 310A-C from slot array 308.

In an embodiment, index manager 144 may determine whether to regenerate local offset table 322A based on a snapshot isolation level, an example attribute, of read query 320. In an embodiment, the snapshot isolation level may be associated with a timestamp received with read query 320. To determine whether to regenerate local offset table 322A, index manager 144 may compare the timestamp (received with read query 320) with time stamps associated with respective prepended updates, deltas 312A-C. In an embodiment when delta 312C is prepended to page 302, index manager 144 may determine to regenerate local offset table 322A if the timestamp associated with delta 312C is older (or issued before) the timestamp associated with read query 320.

In an embodiment, index manager 144 may determine whether to regenerate local offset table 322A based on an attribute of read query 320 and information stored with each delta 312C. For example, depending on the attribute, for example, an isolation level or a snapshot isolation level, index manager 144 may determine that local offset table 322A should be regenerated. But often, read query 320 may not need to access any of the prepended deltas 312A-C. To reduce unnecessary regeneration, index manager 144 may consider whether records (an example of stored information) associated with any of prepended deltas 312A-C are being requested by read query 320 before determining to regenerate local offset table 322A. If not, read query 320 may access records 306 within page 302 via slot array 308, and local offset table 322A may not need to be regenerated. In other words, responsive to the isolation level, index manager 144 may maintain local offset table 322A when read query 320 requests access to records absent from the information stored with deltas 312A-C.

In an embodiment, instead of locating update deltas, such as deltas 312, and generating a local offset table, such as local offset table 322A or 322B, for each read query, index manager 144 may generate a new local offset table whenever a delta update is prepended to page 302. Then, index manager 144 may store the generated local offset tables as corresponding stored offset tables 311. By storing offset tables, index manager 144 enables subsequent read queries to utilize one of stored offset tables 311 without a need to regenerate separate local offset tables for each read query. In an embodiment, index manager 144 may determine whether to store local offset tables 322A-B as corresponding stored offset tables 311 based on how much (or a proportion of) memory is available or free in page 302.

Figure 4A:
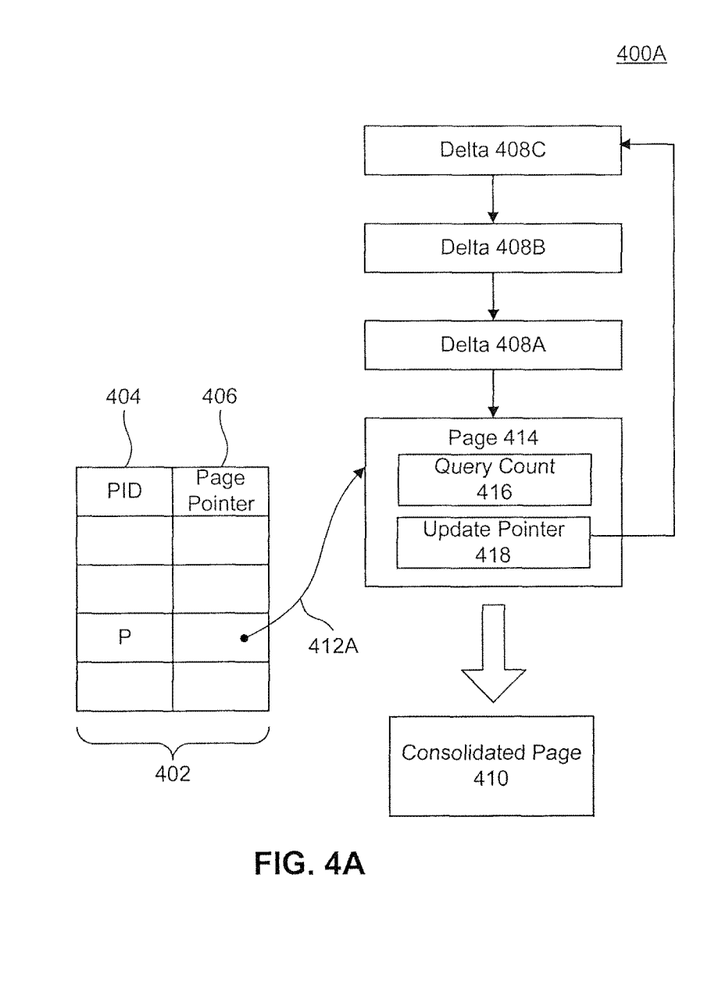
FIGS. 4A-B are diagrams illustrating how an index page is consolidated, according to an example embodiment.
Figure 4B:
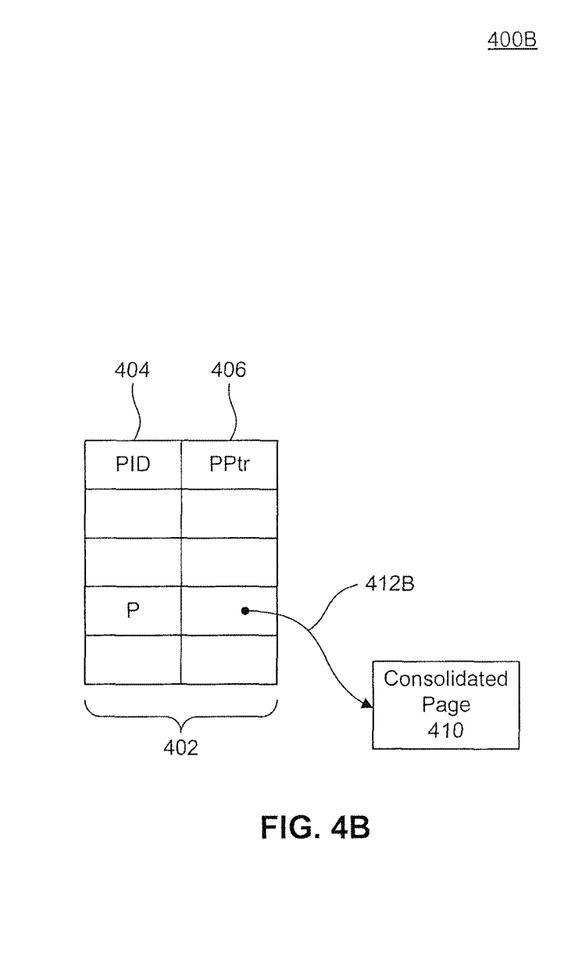

FIG. 4A-B are diagrams 400A-B illustrating how an index page, page 414, is consolidated, according to an example embodiment. Diagram 400A shows mapping table 402 that maps pages 404 identified by a logical identifier, page ID (PID), to page pointers 406, representing the physical addresses of pages 404. In an embodiment, index manager 144 may locate page 414 having PID P via page pointer 412A associated with PID P. Like page 112 of FIG. 1, page 414 may include update pointer 304 (within a header) that points to the most-recently updated delta update, delta 408C. Update pointer 418 may enable index manager 144 to locate one or more deltas 408A-C prepended to page 414. In an embodiment, page 414 may include query count 416 indicating the number of queries that are currently accessing page 414. In an embodiment, index manager 144 may need to maintain page 414 and prepended deltas 408A-C as long as query count 416 is not zero.

In an embodiment, delta consolidator 146 may decide to consolidate page 414 with deltas 408A-C into consolidated page 410 to reduce the memory and processing overhead to maintain deltas 408A-C. In an embodiment, delta consolidator 146 may decide to perform consolidation when a number of the prepended updates exceeds (or meets) a threshold count. In an embodiment, delta consolidator 146 may decide to perform consolidation when the memory needed to store the prepended updates exceeds (or meets) a threshold amount, when either the count threshold or the threshold amount is exceeded, or when both the count threshold and threshold amount are exceeded. In an embodiment, delta consolidator 146 may decide to perform consolidation whenever records associated with page 414 are to be flushed to disk storage, such as storage device 106 of FIG. 1.

To create consolidated page 410, delta consolidator 146 may apply deltas 408A-C as records into page 414. Delta consolidator 146 may similarly update a slot array within page 414 to correspond to sorted entries of the stored records. In an embodiment, delta consolidator 146 may only garbage collect the memory for storing page 414 and deltas 408A-C when query count 416 reaches zero.

As shown with respect to FIG. 4B, delta consolidator 146 garbage collects page 414 and deltas 408A-C by deallocating the memory for storing these components. Delta consolidator 146 also updates page pointer 406 corresponding to page P from pointer 412A to pointer 412B such that subsequent queries can locate consolidated page 410 via mapping table 402.

Figure 5:
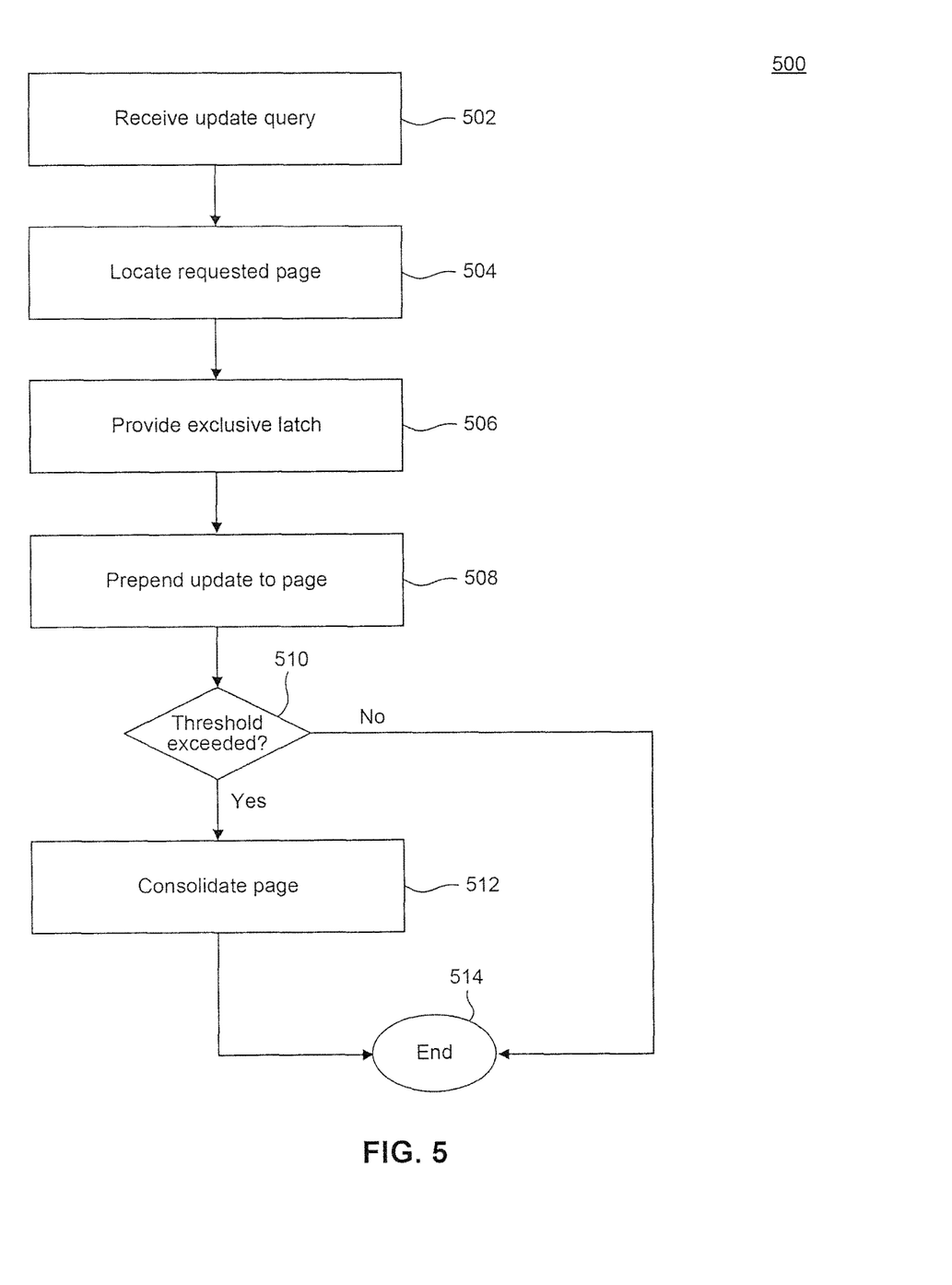
FIG. 5 is a flowchart illustrating a process for consolidating an index page, according to an example embodiment.

FIG. 5 is a flowchart for a method 500 for consolidating an index page, according to an example embodiment. Method 500 can be performed by processing logic that can comprise hardware (e.g., circuitry, dedicated logic, programmable logic, microcode, etc.), software (e.g., instructions executing on a processing device), or a combination thereof.

In step 502, a query processor, such as query processor 142 from FIG. 1, receives an update query from a client, such as client 102 from FIG. 1. The received update query may update one or more records in an index page, such as page 414 of FIG. 4A.

In step 504, an index manager, such as index manager 144 of FIG. 1, locates the requested index page. In an embodiment, the index manager may traverse one or more nodes of a B-tree index, such as B-tree index 116 of FIG. 1, to locate the index page. Each node (and corresponding index page) within the B-tree index may be identified using a logical identifier (a page ID or a PID), such as page 404 of FIG. 4A. To locate the physical index page 414, the index manager looks up page pointer 412A corresponding to that logical page, page 414, in a mapping table, such as mapping table 402 of FIG. 4A.

In step 506, to minimize the structural changes that need to be made to the b-tree index, the index manager may provide an exclusive latch to the received update query. In this example implementation, an exclusive latch provides physical consistency between update queries by preventing other update queries from concurrently accessing the data page as the received update query. In an embodiment where exclusive latches are not needed, method 500 may omit step 506.

In step 508, the index manager prepends the update, such as delta 408C, to the located index page.

In step 510, a delta consolidator, such as delta consolidator 146 of FIG. 1, determines whether one or more specific thresholds are exceeded (or met). For example, as described with respect to FIG. 4, the delta consolidator may determine whether the number of delta updates prepended to the index page exceeds a threshold count. When the one or more thresholds are exceeded, method 500 proceeds to step 512. Otherwise, method 500 ends in step 514.

In step 512, the delta consolidator consolidates the index page with the prepended updates, as described above with respect to FIGS. 4A-B.

Figure 6:
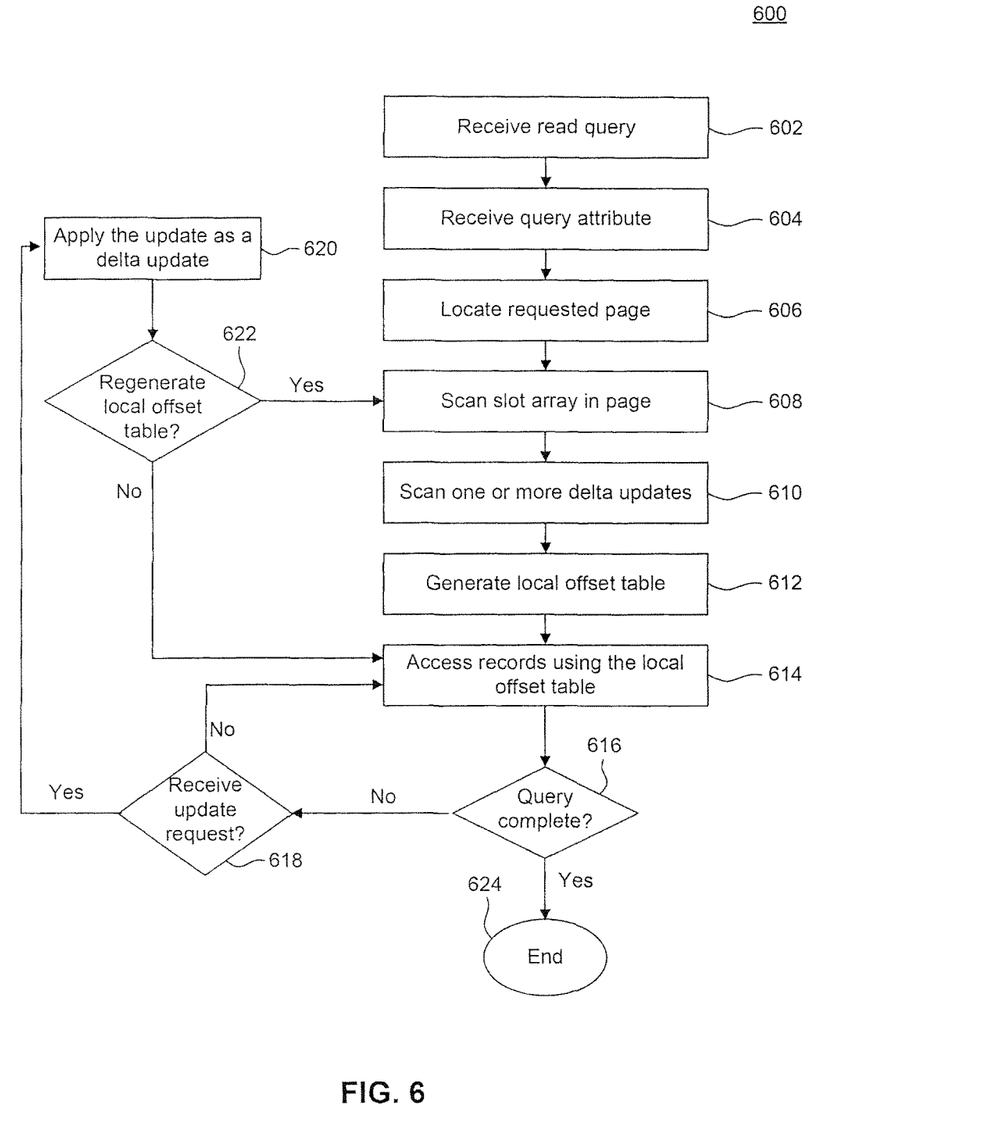
FIG. 6 is a flowchart illustrating a process for providing read queries latch-free access to an index page, according to an example embodiment.

FIG. 6 is a flowchart for a method 600 for providing read queries latch-free access to an index page, according to an example embodiment. Method 600 can be performed by processing logic that can comprise hardware (e.g., circuitry, dedicated logic, programmable logic, microcode, etc.), software (e.g., instructions executing on a processing device), or a combination thereof.

In step 602, a query processor, such as query processor 142 from FIG. 1, receives a read query from a client, such as client 102 from FIG. 1. The read query may include a request to access records associated with an index page, such as page 302 of FIG. 3.

In step 604, the query processor receives or generates one or more attributes for the received read query. For example, attributes may include an isolation level required by the received read query, or a timestamp indicating when the read query was initiated.

In step 606, an index manager, such as index manager 144 of FIG. 1, locates the requested index page using a similar process as described with respect to step 504 of FIG. 5.

In step 608, the index manager locates and scans the slots, such as slots 310A-C of FIG. 3, within a slot array of the index page.

In step 610, the index manager locates and scans one or more delta updates, such as deltas 312, prepended to the index page. In an embodiment, step 610 may be performed before or in concurrence with step 608.

In step 612, to enable the received read query to concurrently access the index page without blocking other read or update queries, the index manager generates a local offset table, such as local offset table 322A of FIG. 3, for the read query. To generate the local offset table, the index manager may sort the scanned slots with the scanned one or more delta updates, as described above with respect to FIGS. 2-3.

In step 614, the index manager accesses records associated with the index page using the local offset table generated in step 612. The records may be records stored in the index page or records updated by the prepended delta updates.

In step 616, if the read query completes and no longer accesses the index page, method 600 ends in step 624. Otherwise, method 600 proceeds to step 618.

In step 618, the index manager determines whether an incoming update query is requesting access to the index page. If an update query is received, method 600 proceeds to step 620. Otherwise, method 600 proceeds to step 614.

In step 620, the index manager applies the update in the received update request to the index page by prepending the update as a most-recent delta update, as further described with respect to FIGS. 2-3.

In step 622, based on one or more attributes associated with the read request of step 602, the index manager determines whether to regenerate the local offset table previously generated in step 612. In an embodiment, the index manager determines to regenerate the local offset table based on an associated isolation level and the information of the delta updates. The information of each delta update may include, for example, a timestamp, an operation, or the affected record. In an embodiment, the isolation level may be a specific snapshot isolation level If the index manager determines to maintain the previously generated local offset table, method 600 proceeds to step 614. Otherwise, method 600 proceeds to step 608.

Figure 7:
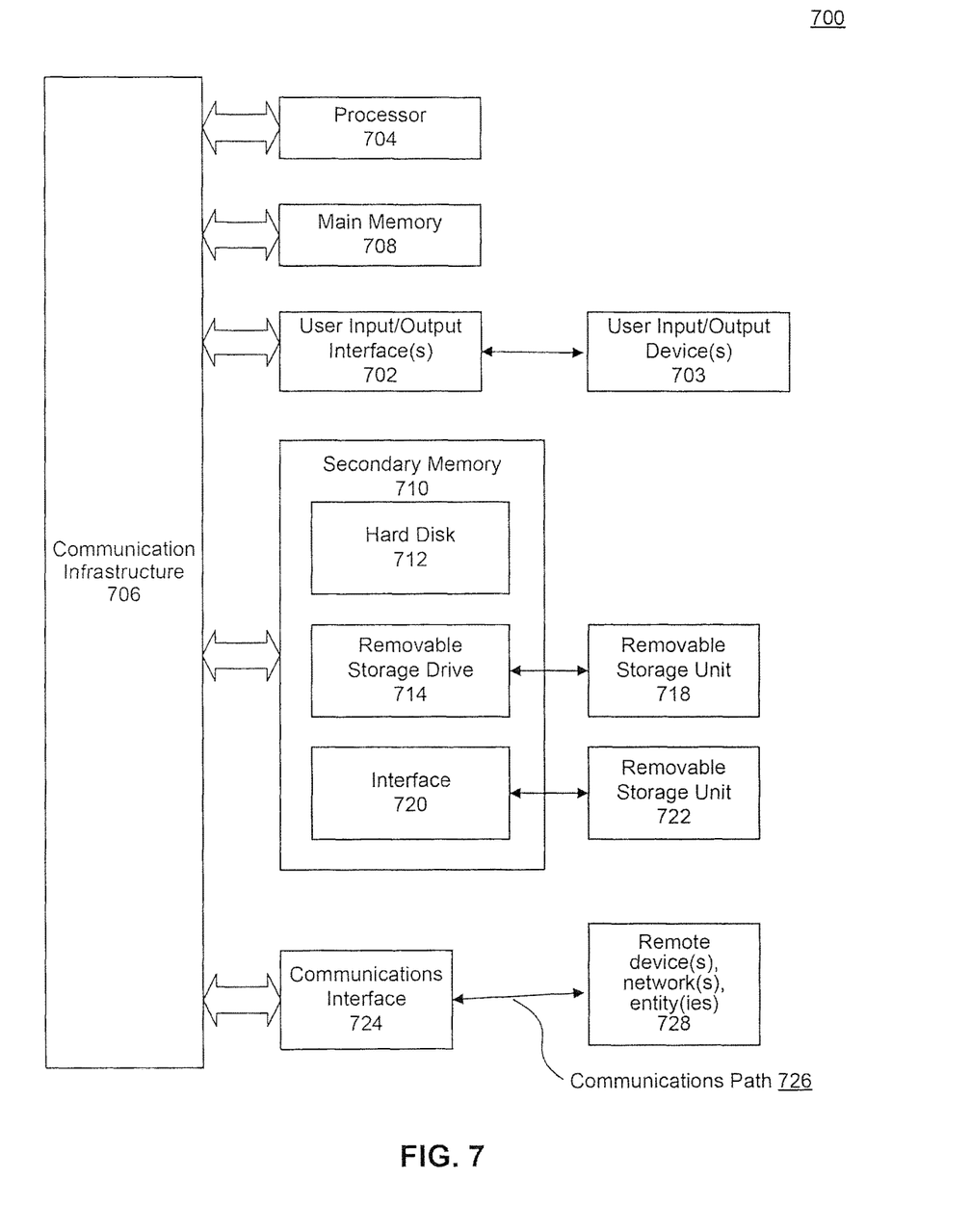
FIG. 7 is an example computer system useful for implementing various embodiments.

Various embodiments can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interlace 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:
    receiving a request from a read query to access one or more records of a database table implementing an index on one or more columns of the table, wherein the index comprises an index page that includes a slot array and a header comprising an update pointer;
    locating one or more updates prepended to the index page by locating a most recently prepended update indicated by the update pointer;
    generating a local offset table with entries updates in the slot array and the located one or more updates;
    determining an isolation level that indicates whether the read query is precluded from accessing new prepended updates received after the read query; and
    providing latch-free access to the one or more records to the read query from the local offset table based on the isolation level, wherein an update query has concurrent access to the one or more records;
    while performing the accessing, concurrently applying an update from an update query by prepending the update to the located one or more updates;
    determining to regenerate the local offset table for the read query based on the isolation level and information of each prepended update; and
    maintaining the generated local offset table when the isolation level precludes reading the prepended update or records requested by the read access are absent from the information,
    wherein at least one of the receiving, locating, generating, and accessing are performed by one or more computers.

2. The method of claim 1, further comprising:
    performing the locating and the generating for each read query to enable the read query to access the index page concurrently with another read query or an update query.

3. The method of claim 2, wherein the update query is concurrently accessing the index page, further comprising:
    consolidating the index page with the one or more prepended updates when either a number of the prepended updates exceed a threshold count or storing the one or more prepended updates requires memory exceeding a threshold amount; and
    providing subsequent queries access to the consolidated index page instead of the index page.

4. The method of claim 3, further comprising:
    storing, within the index page, a query count indicating a number of queries currently accessing the index page; and responsive to generating the consolidated index page, garbage collecting the index page when the query count reaches zero.

5. The method of claim 1, further comprising:
changing the update pointer to a pointer of the applied update.

6. The method of claim 5, further comprising:
receiving a timestamp associated with the access request;
associating the one or more prepended updates with corresponding update timestamps; and
determining whether to regenerate the local offset table for the read query by comparing the access timestamp with one or more of the update timestamps.

7. The method of claim 1, further comprising:
based on how much memory is available in the index page, storing the local offset table in the index page as a stored offset table; and
enabling a subsequent read query to locate and access records associated with the index page by using the stored offset table without requiring a subsequent local offset table to be generated for the subsequent read query.

8. A system, comprising:
a memory; and
at least one processor coupled to the memory and configured to:
receive a request from a read query to access one or more records of a database table implementing an index on one or more columns of the table, wherein the index comprises an index page that includes a slot array and a header comprising an update pointer;
locate one or more updates prepended to the index page by locating a most recently prepended update indicated by the update pointer;
generate a local offset table with entries in the slot array and the located one or more updates;
determine an isolation level that indicates whether the read query is precluded from accessing new prepended updates received after the read query; and
provide latch-free access to the one or more records to the read query from the local offset table based on the isolation level, wherein an update query has concurrent access to the one or more records;
while performing the accessing, concurrently applying an update from an update query by prependinq the update to the located one or more updates;
determine to regenerate the local offset table for the read query based on the isolation level and information of each prepended update; and
maintain the generated local offset table when the isolation level precludes reading the prepended update or records requested by the read access are absent from the information.

9. The system of claim 8, wherein the update query is concurrently accessing the index page, the at least one processor further configured to:
perform the locate and the generate for each read request to enable the read query to access the index page concurrently with another read query or an update query;
consolidate the index page with the one or more prepended updates when either a number of the prepended updates exceed a threshold count or storing the one or more prepended updates requires memory exceeding a threshold amount; and
provide subsequent queries access to the consolidated index page instead of the index page.

10. The system of claim 8, the at least one processor further configured to:
change the update pointer to a pointer of the applied update.

11. The system of claim 10, the at least one processor further configured to:
receive a timestamp associated with the access request;
associate the one or more prepended updates with corresponding update timestamps; and
determine whether to regenerate the local offset table for the read query by comparing the access timestamp with one or more of the update timestamps.

12. A tangible computer-readable device having instructions stored thereon that, when executed by at least one computing device, causes the at least one computing device to perform operations comprising:
receiving a request from a read query to access one or more records of a database table implementing an index on one or more columns of the table, wherein the index comprises an index page that includes a slot array and a header comprising an update pointer;
locating one or more updates prepended to the index page by locating a most recently prepended update indicated by the update pointer;
generating a local offset table with entries in the slot array and the located one or more updates;
determining an isolation level that indicates whether the read query is precluded from accessing new prepended updates received after the read query;
providing latch-free access to the one or more records to the read query from the local offset table based on the isolation level, wherein an update query has concurrent access to the one or more records;
while performing the accessing, concurrently applying an update from an update query by prepending the update to the located one or more updates;
determining to regenerate the local offset table for the read query based on the isolation level and information of each prepended update; and
maintaining the generated local offset table when the isolation level precludes reading the prepended update or records requested by the read access are absent from the information.

13. The computer-readable device of claim 12, the operations further comprising:
changing the update pointer to a pointer of the applied update; and
receiving an attribute identifying an isolation level of the access request.

14. The method of claim 1, further comprising a linked list of delta updates, wherein each delta update includes a pointer to a next recently prepended delta, and wherein a link of each delta includes a pointer to the index page.

15. The method of claim 1, wherein the determining whether to regenerate comprises:
regenerating the local offset table for the read query based upon both the isolation level indicating that the read query can access the new prepended updates and receiving a new prepended update received after the read query.

16. The method of claim 1, further comprising:
determining a selection of one or more of the prepended updates that correspond to records being requested by the read query, wherein one or more other of the prepended updates do not correspond to the records being requested by the read query; and regenerating the local offset with the determined selection of the one or more prepended updates that correspond to records being requested by the read query.

* * * * *